United States Patent
Amrhein et al.

(10) Patent No.: US 6,779,174 B2
(45) Date of Patent: Aug. 17, 2004

(54) INDUSTRIAL CONTROLLER WITH CLOCK-SYNCHRONOUS RUNNING LEVEL MODEL

(75) Inventors: Armin Amrhein, Kuemmersbruck (DE); Johannes Birzer, Stulln (DE); Martin Kiesel, Poxdorf (DE); Regina Schmitt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 464 days.

(21) Appl. No.: 09/942,696

(22) Filed: Aug. 30, 2001

(65) Prior Publication Data

US 2002/0082734 A1 Jun. 27, 2002

(30) Foreign Application Priority Data

Dec. 27, 2000  (DE) .......................................... 100 65 419

(51) Int. Cl.[7] .................................................. G06F 9/44
(52) U.S. Cl. ...................................................... 717/131
(58) Field of Search ................................ 717/131, 127, 717/128–130, 132–133; 700/19, 9

(56) References Cited

U.S. PATENT DOCUMENTS

| | | | | |
|---|---|---|---|---|
| 5,305,450 A | * | 4/1994 | Naito et al. .................. | 717/172 |
| 5,613,115 A | * | 3/1997 | Gihl et al. .................... | 717/123 |
| 5,872,972 A | * | 2/1999 | Boland et al. ............... | 718/102 |
| 5,896,566 A | * | 4/1999 | Averbuch et al. ........... | 717/173 |
| 6,594,541 B1 | * | 7/2003 | Wucherer et al. ........... | 700/159 |

FOREIGN PATENT DOCUMENTS

| | | |
|---|---|---|
| DE | 19740550 | 4/1998 |
| DE | 19931933 | 7/1999 |

OTHER PUBLICATIONS

Regehr. Scheduling Tasks with Mixed Preemption Relations for Robustness to Timing Faults. IEEE. 2002. pp. 315–326.*
Ish–Shalom et al. Signal Processor Architecture for High–Performance Real–Time Applications. IEEE. 1989. pp. 184–193.*
Fujita et al. An Active Scheduler: Autonomous Concurrency Control of Parallel Programs in a Distributed Environment. IEEE. 2001. pp. 415–422.*

* cited by examiner

Primary Examiner—Wei Zhen
(74) Attorney, Agent, or Firm—Baker Botts L.L.P.

(57) ABSTRACT

A runtime system of an industrial controller has a running level model which has a plurality of running levels of different types with different priority. This stratification allows for minimization of the communication between the process controller and motion controller tasks. The running level model has a hierarchical structure with various running levels such as synchronously clocked levels, a user level for system exceptions, an event-controlled user level, a time-controlled user level, a sequential user level and a cyclical user level. Other prioritizing stratifications also may be provided.

21 Claims, 8 Drawing Sheets

INDUSTRIAL CONTROLLER WITH CLOCK-SYNCHRONOUS RUNNING LEVEL MODEL

BACKGROUND OF THE INVENTION

1. Field of the Invention

The invention relates to industrial controllers, and, more particularly, to an industrial controller equipped with a runtime system, containing a running level model having a plurality of prioritized running levels of different types. The invention also relates to the creation of a runtime system of an industrial controller with synchronously clocked system and user levels.

2. Description of the Related Art

Today, it is customary, both for stored-program control (SPC) and for motion control (MC) systems, to provide different hierarchical running levels and to have different software applications for controlling the respective technical processes. The software applications used today may be user-programmed or they can have built-in system functions.

It is known from German application DE 197 40 550 A1, which is hereby incorporated by reference in its entirety, that process control functionalities of the stored-program controllers "SPC" and motion functionalities of MC controllers can be integrated in a uniform configurable control system.

This SPC/MC integration is obtained by using interconnecting SPC and MC control modules. However, when the integration is carried out in such a way, an optimum and efficient task structure is not achieved for all control tasks. Furthermore, mostly the classic MC functionalities are supported, with this type of integration, particularly for machine tools, whereas other requirements for the controller, as they are known from the operation of production machines, are not optimally supported by this type of interconnection of SPC and MC control modules.

In German application DE 19 93 19 33.2 which is hereby incorporated by reference in its entirety, a communication system clock is used between the PC system and the peripheral devices for a change between a real-time operating program and a non-real-time operating program. Here, however, it is the task of this communication system clock to allow the smoothest possible change between real-time and non-real-time applications in an industrial process. However, in this example, the basic clock is derived only from the clock of the communication medium and is only used for changing the operating system mode of a PC system.

Accordingly, there remains a need for the integration of a plurality of automation components in a uniform running level model of a respective runtime system of an industrial controller.

An object of the present invention is to create optimum distinctive characteristics of an industrial controller for different control tasks and different boundary conditions or requirements of the underlying technical process, providing both SPC and MC functionality and consequently also being suitable for the control of production machines.

SUMMARY OF THE INVENTION

In order to meet this and other objects which will become apparent with reference to further disclosure set forth below, the present invention provides an integration system and method for automation components, in which optimum distinctive characteristics are achieved by a uniform configurable running level model for the control tasks of the industrial controller.

The runtime system of the industrial controller contains a running level model which has a plurality of running levels of different types which are associated with different priorities. The following exemplary running levels may be provided in the system:

(a) a group of levels with synchronously clocked levels derived from a basic clock, including at least one system level and at least one user level, where the levels of this group of levels can have further prioritizing with respect to one another;

(b) a user level for system exceptions;

(c) an event-controlled user level;

(d) a time-controlled user level;

(e) a sequential user level; and (f) a cyclical user level, user levels of the group of levels a) optionally being able to run synchronously in relation to one of the system levels of the group of levels a).

An advantage of this stratification is that the communication between the tasks of the stored-program controller (SPC) and those of the motion controller (MC) is minimized. A further advantage is that the programming of the control tasks for the SPC and the MC can take place in a uniform programming language with a uniform creation interface which allows the user to flexibly create a running level model tailor-made for his respective requirements.

In one embodiment of the present invention, the basic clock of the running level model is derived from either an internal timer, an internal clock of a communication medium, an external device or from a variable which belongs to the technological process. As a result, the basic clock for the running level model is derived in a flexible manner. The fact that the basic clock for the running level model may be derived from a variable which belongs to the technological process allows direct feedback from the technological process to the controller to be readily obtained.

In another embodiment of the present invention, an event-controlled user level, a time-controlled user level, a sequential user level, a cyclical user level and a user level for system exceptions are optional. As a result, the user can flexibly create a controller which efficiently achieves the actual requirements and which contains the running levels required at the specific time to minimize unnecessary overhead.

In yet another embodiment of the present invention, the synchronous levels are clocked in relation to the basic clock with a step-up and/or step-down ratio and/or in the ratio 1:1. As a result, the levels can be easily clocked to a multiple of the basic clock or else be clocked in to a reciprocal multiple. On the basis of a common starting variable, step-up ratios or step-down ratios can consequently be achieved very easily for the respective levels.

In still another embodiment of the present invention, further prioritizing stratifications are provided within the running levels. As a result, the software structure of the industrial controller can be adapted to the different control tasks or to the requirements of the underlying technical process. Consequently, for example, different causes of faults can be assigned to different levels, for example, with ascending priority.

In yet another embodiment of the present invention, user tasks are optionally run through during system running-up. Furthermore, it can be ensured by user programming that during system running-up or that, by user programming, it can be ensured during system running-down that the axes present in the system assume a defined position.

In still another embodiment of the present invention, user programs are loaded into the user levels. This allows the user to adapt the functionality of the controller to the underlying requirements of the technical process in user programs and also allows the user to load the user programs into different user levels, to achieve distinctive characteristics of the controller that are effective for specific applications.

In still another embodiment of the present invention, user programs which, depending on the type of user level, are programmed in a cycle-oriented or sequential manner, are loaded into the user levels. In this arrangement, the user can load both cycle-oriented user programs (for example typical SPC functionality) and sequential or sequence-oriented user programs (for example typical motion functionality) into a uniform running level model or runtime system of an industrial controller. The user can further load programs programmed according to different paradigms (cycle-oriented for SPC functionality and sequentially or sequence-oriented for motion functionality) into the user levels of the running level model. Cycle-oriented programs are typically cycle-time-monitored.

In yet another embodiment of the present invention, the additional loading of technology packages into the system levels allows the technological functionality of the controller to be extended. In this case, the user can dynamically tailor the set of basic system commands to the respective requirements of the underlying technological process or control task. The basic system in this case forms the extent of the items delivered for the runtime system of a controller, such as a real-time operating system, a running system (with system and user levels), voice commands, the SPC set of commands and also communication interfaces (for example LAN, I/O) and technological interfaces (for example drives, sensors) with respect to the technical process. Consequently, the necessary basic functionality of a controller is located in the basic system. In this case, the basic system is capable of running on a wide variety of HW platforms (for example PC-based, drive-based, controller-based). In addition, the loading of technology packages also provides a user with the possibility of scaling the runtime system of the controller.

In still another embodiment of the invention, the mechanisms which enable users to wait in the program cycle for any desired condition are provided. The program flow continues when the condition is satisfied and the program flow is stopped until it is established that the condition has been satisfied. In this case, while waiting for the condition to be satisfied, checking for the condition being satisfied is assigned a higher priority in comparison with the priority of the current task. This mechanism makes it possible to express a unified and closed task definition in a user program code without further mechanisms, such as event handlers. The mechanism described and the associated command are referred to hereafter as the "wait_for_condition." This command avoids a management overhead in the controller, which directly enhances the system performance. The command also supports the locality principle from a programming viewpoint, which, for example, can make program debugging easier.

In another embodiment of the present invention, process signals and/or internal signals of the controller and/or variables from user programs can be used for the formulation of the conditions being monitored. This makes it possible for the user to combine process signals, internal control signals or user variables in a uniform way when describing the conditions.

In yet another embodiment of the present invention, various running levels which are processed in multiples of a basic clock are provided, technological functions being freely assigned to the running levels. Axes and technological sequences require different accuracies and response capabilities. They can, therefore, be computed in different timing patterns (for example one axis is computed in the 1 ms clock, another in the 2 ms clock). For lower overall loading of the runtime system or the overall system, the corresponding tasks are processed only with as high a priority as necessary in the present embodiment.

In still another embodiment of the present invention, the runtime system of the controller contains a running level model which has a plurality of running levels of different types and different priorities. Exemplary running levels include:
 (a) a level which is activated when there are technological faults;
 (b) a level which is activated when there is cycle time monitoring of the background tasks;
 (c) a level which is activated when there are programming faults;
 (d) a level which is activated when there are system faults;
 (e) a level which is activated when there are faults or alarms in the peripherals;
 (f) a level which is activated when time monitors respond;
 (g) at least one level which is activated when user interrupts are detected;
 (h) an interpolator level;
 (i) at least one level for timer interrupts;
 (j) at least one level for the, preferably sequential, processing of motion tasks; and
 (k) a level for background processing.

Other user tasks are run through during system running-up and/or during system running-down. This running level structure allows for an efficient runtime system for industrial controllers for production machines.

In yet another embodiment of the present invention, the basic clock of the running level model is derived either from an internal timer, an internal clock of a communication medium, or from a variable which belongs to the technological process. A user consequently has greater flexibility for creating the basic clock. For example, the basic clock can be derived from equidistant bus systems, such as the Profibus.

Also in accordance with the invention is the method for integrating automation components which includes the steps of:
 (a) clock generation from either of an internal hardware clock, a communication system and a variable of a technological process;
 (b) providing system and user levels for the runtime system which provide running levels synchronized with respect to this basic clock;
 (c) providing at least one user level which is integrated in a synchronous manner with respect to the system level or levels; and
 (d) programming the user level or user levels.

As a result, a user can create, in a defined way, a runtime system of an industrial controller with synchronously clocked system and user levels which integrates process control functionalities of stored-program controllers "SPC" and motion functionalities of MC controllers.

DETAILED DESCRIPTION OF THE DRAWINGS

Figure 1:
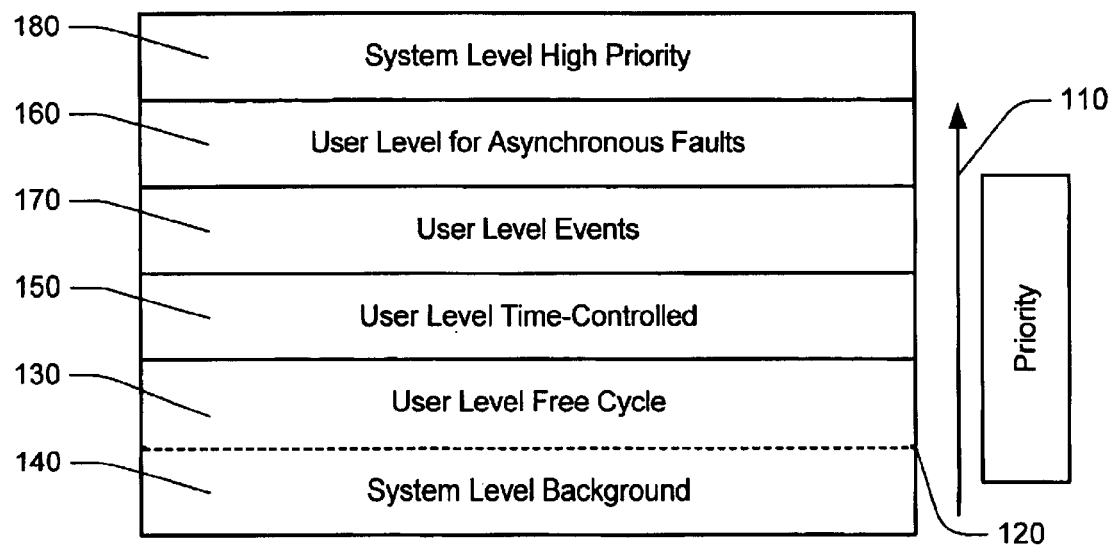
FIG. 1 is an illustrative diagram presenting a hierarchical structure of the main running levels of a classic stored-program controller.

Referring to FIG. 1, an illustrative diagram presenting a hierarchical structure of the main running levels of a classic stored-program controller (SPC), arranged according to their priority, is shown. The increase in priority is symbolized there by an arrow 110. In the lowest-priority level 120, a dashed line indicates that two different tasks of substantially equal priority are performed. More particularly a free cycle 130, i.e. "user level free cycle", and a background system level 140, i.e. "system level background" running level make up the lowest priority level 120. The background system level 140 is generally reserved, for example, for communication tasks. The next higher priority user level, referred to as "user level time-controlled" 150, the calling clock of the tasks or of the programs at this level can be parameterized. Monitoring takes place to determine whether the processing of a user program of this clocked level has been completed prior to the occurrence of the next start event. If the clock time elapses without the user program of the assigned level being processed to completion, a corresponding task of a next-but-one, in priority terms, "user level for asynchronous faults" 160 is started. In this "user level for asynchronous faults" 160 level, the user can program operations for the handling of fault states.

The "user level time-controlled" 150 level is followed in priority by a "user level events" 170 level. The response to external or internal events takes place within the "user level events" 170. A typical example of such an event is the switching of a binary or digital input, whereby typically an event is triggered. In a "system level high priority" 180 level the tasks of the operating system which ensure the operating mode of the programmable controller (SPC) reside.

Figure 2:
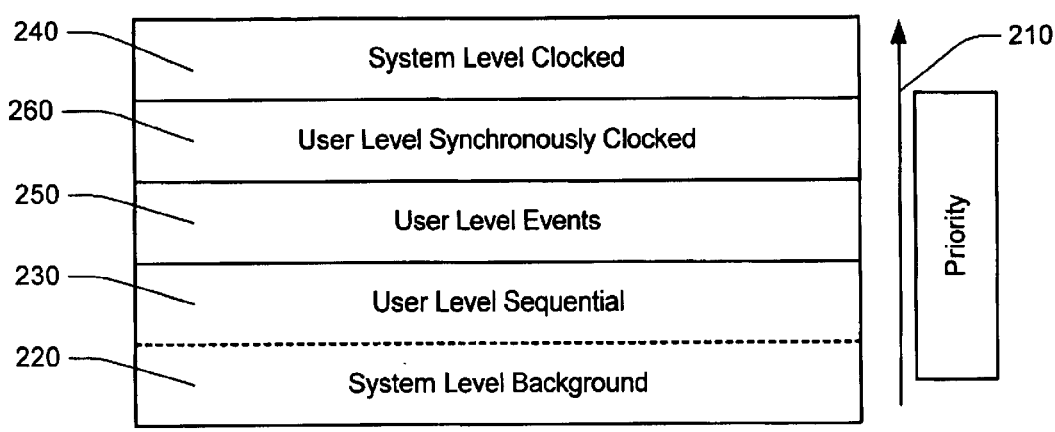
FIG. 2 is an illustrative diagram presenting a hierarchical structure of the main running levels of a motion controller.

Referring to FIG. 2, an illustrative diagram presenting a hierarchical structure of the main running levels of a motion controller (MC) is shown. As in FIG. 1, the individual levels in FIG. 2 are arranged hierarchically according to their priority, as symbolized by an arrow 210. A "system level background" 220 and a "user level sequential" 230 level have an equal priority, that is the lowest priority. This unified nature in terms of tasks is symbolized by a dashed line. The tasks of the "user level sequential" 230 level are processed together with the tasks of the "system level background" 220 level in the round-robin procedure. Typical tasks of the "system level background" 220 are, for example, communication tasks. In the "user level sequential" 230 level, user programmed component for the actual control task are performed. If, in one of these parts of the program, the controller encounters a movement or positioning command, a "suspend" is set, i.e., the user program is interrupted at this point. In this case, a command is synchronously used. The processing of this movement or positioning command takes place in a highest-priority "system level clocked" 240 and each and every position controller or interpolator which is running in the "system level clocked" 240 level executes this movement or positioning command. After execution of the command, control returns to the "user level sequential" 230 level and the user program interrupted by "suspend" is continued by a "resume" at the same point. The "system level clocked" 240 level contains not only the already mentioned position controllers but also the interpolation part of the control.

A "user level events" 250 resumes at the lowest-priority level. Accommodated here are those tasks which respond to external or internal events, such as alarms.

In a "user level synchronously clocked" 260 level, synchronously clocked user tasks are performed, such as controller functionalities. These tasks are synchronized in relation to clocked system functions, such as the interpolator, position controller or cyclical bus communication.

Figure 3:
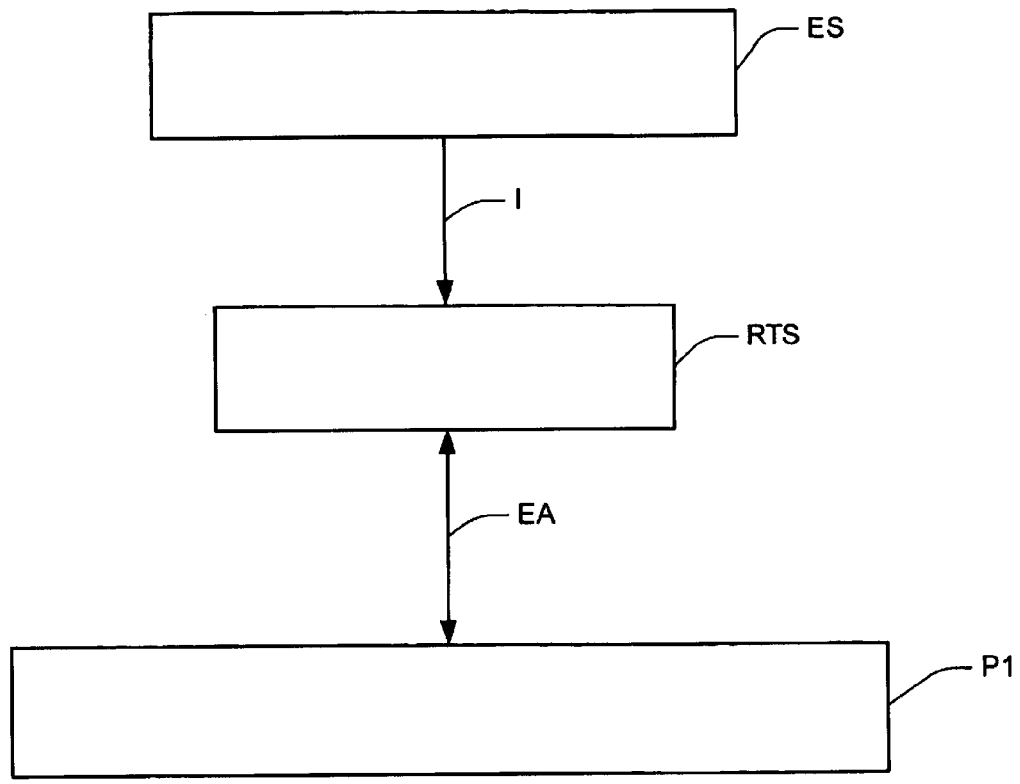
FIG. 3 is a block diagram of an industrial controller.

Referring to FIG. 3, a block diagram of an industrial controller is illustrated. The control of a technical process P1 is performed by means of the runtime system RTS of an industrial controller. The connection between the runtime system RTS of the controller and the technical process P1 takes place bidirectionally via the inputs/outputs EA. The programming of the controller, and consequently control of the operation of the runtime system RTS, takes place in the engineering system ES. The engineering system ES contains tools for configuring, project planning and programming for machines or for controlling technical processes. The programs created in the engineering system are transferred via the information path I into the runtime system RTS of the controller. With respect to its hardware equipment, an engineering system ES usually comprises a computer system with a graphics screen (for example display), input aids (for example keyboard and mouse), processor, main memory and secondary memory, a device for accepting computer-readable media (for example floppy disks, CDs) and also connection units for data exchange with other systems (for example further computer systems, controllers for technical processes) or media (for example the Internet). A controller usually includes input and output units, and also a processor and program memory. It is also possible for the control of a technical process P1 to be performed by means of a plurality of runtime systems RTS of industrial controllers.

Figure 4:
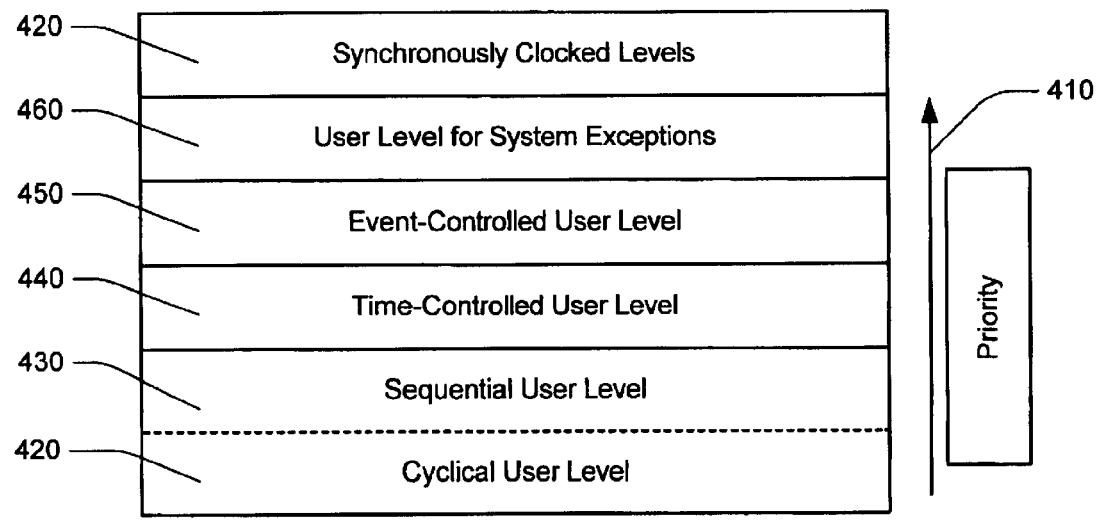
FIG. 4 is an illustrative diagram presenting a hierarchical structure of the running level model of this industrial controller.

Referring to FIG. 4, an illustrative diagram presenting a hierarchical structure of a running level model of an industrial controller is shown. The prioritizing of the levels is indicated by an arrow 410 in the direction of the highest priority. The lowest-priority levels are a "cyclical user level" 420 and a "sequential user level" 430. These two levels operate with the same priority. Therefore, these levels are separated in the representation according to FIG. 4 by a dashed line. The "cyclical user level" 420 includes a "background task", which is cycle-time-monitored. In the "sequential user level" 430, the "motion tasks" are performed. The "motion tasks" are not cycle-time-monitored and serve essentially to describe sequential sequences. The "motion tasks" are processed virtually in parallel. Generally, all the user levels contain one or more tasks. The tasks receive the user programs. The tasks of the "cyclical user level" 420 and of the "sequential user level" 430 are processed in a common round-robin cycle.

The next-following level of higher priority is the "time-controlled user level" 440. The tasks of this level are activated in a time-controlled manner. The time control may be set in a granularity of milliseconds. The "time-controlled user level" 440 is followed by the "event-controlled user level" 450. In this level, after detection of a user interrupt, "user interrupt tasks" are activated. User interrupt events may be formulated as a logical combination of process events and/or internal states.

The next level higher priority is a "user level for system exceptions" 460. At this "level", monitoring is carried out of system interrupts, the occurrence of which has the effect of generating "exceptions", i.e. instances of handling exceptional cases. In the "user level for system exceptions" 460, there are, for example, the following tasks, which are activated when a corresponding system interrupt occurs:

(a) "time fault task", which is activated when time monitors respond;
(b) "peripheral fault task", which is activated, for example, in the event of process and diagnostic alarms, but also in the event of station failure or station return;
(c) "system fault task", which is activated in the event of general system faults;
(d) "program fault task", which is activated in the event of programming faults (for example division by zero);
(e) "time fault background task", which is activated when the cycle time monitoring of the background task responds; and
(f) "technological fault task", which is activated in the event of technological faults.

Figure 5:
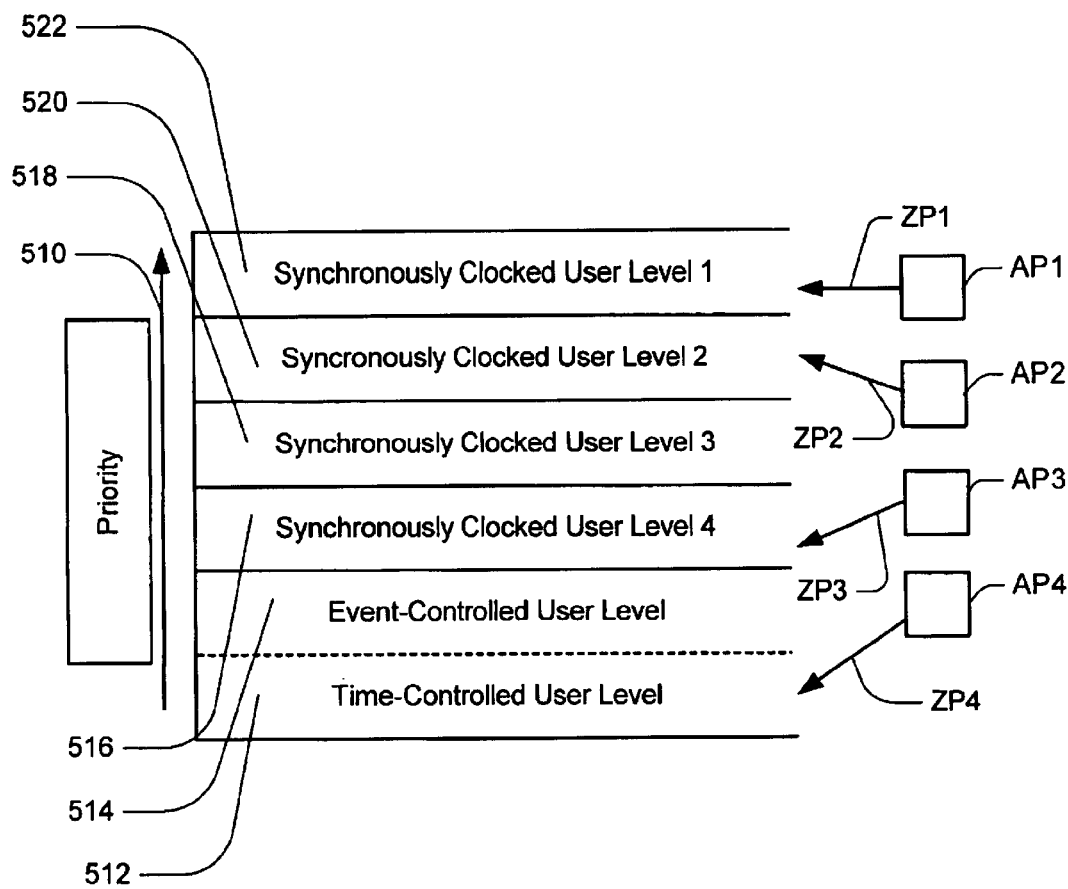
FIG. 5 is an illustrative diagram presenting the loading of user programs into the user levels.
Figure 6:
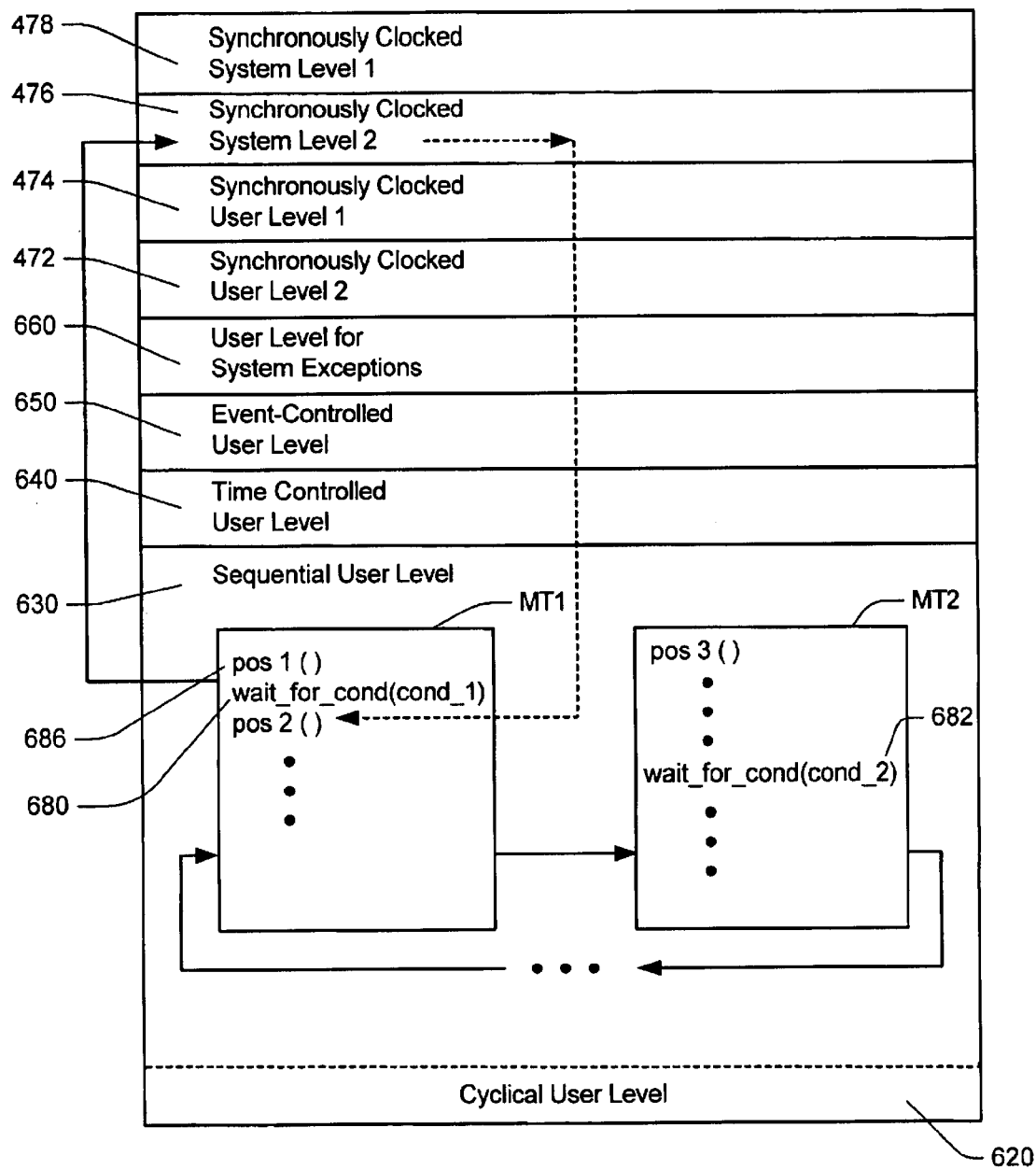
FIG. 6 is an illustrative diagram presenting a hierarchical structure of the integrative running level model with a wait_for_condition command.

The next group of levels is a "synchronously clocked levels" 470 group. This group of levels has the highest priority in the running level model. The individual levels of this group of levels may have further prioritization with respect to one another. As illustrated in FIG. 6, the group of "synchronously clocked levels" 470 includes at least one system level and at least one user level. The system levels include the system functions such as position controller or interpolator functions. As illustrated in FIG. 5, user programs AP1–AP4 also can be flexibly loaded by a user into the user levels 512, 514, 516, 518, 520, 522 of this group.

Figure 7:
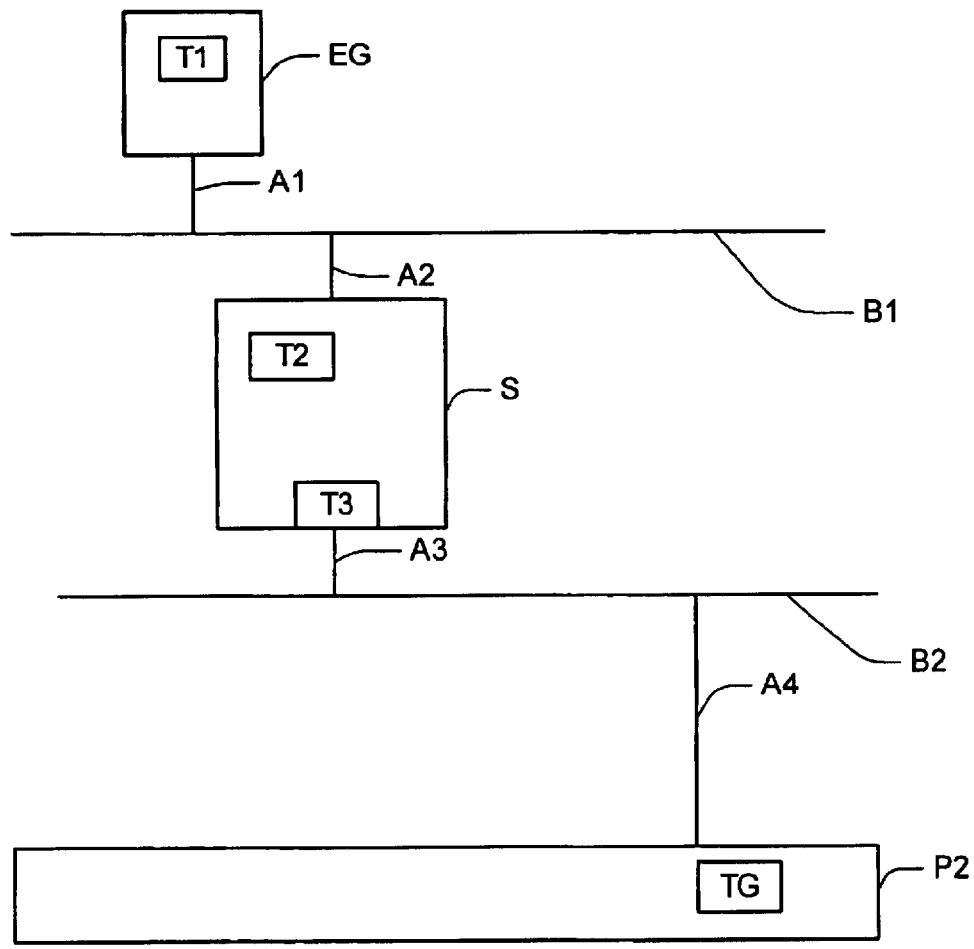
FIG. 7 is a block diagram illustrating how the basic clock is obtained for the industrial controller.

Referring to FIG. 7, there are a number of different possibilities for clock generation for the clock control of the "synchronously clocked levels" 470. The basic clock may come, for example, from an internal timer T1 or from an internal clock T3 of a communication medium (for example Profibus) or else the clock may also be derived from a process event of the technological process. Such a process event may be, for example, the clock rate TG of an operation on a production machine or packaging machine. User levels of the group of levels "synchronously clocked levels" 470 may in this case be clocked on the basis of the basic clock, but they may also run synchronously with respect to one of the system levels of the group of "synchronously clocked levels" 470. The user tasks of this user level which are synchronous to a system level consequently have a synchronous, i.e. deterministic, relationship with a system level which can be flexibly fixed by the user. This has the advantage that deterministic responses to system tasks (system tasks run in the system levels) which the user has programmed in his user tasks, which run in the user levels of the group of "synchronously clocked levels" 470, are guaranteed by the system. For example, the system can provide that this "synchronous user level" is correspondingly activated before the interpolator, or before any other desired system function.

Referring to FIG. 4, the "time-controlled user level" 440, the "event-controlled user level" 450, the "sequential user level" 430, the "cyclical user level" 420 and a "user level for system exceptions" 460 are optional.

The task of the "cyclical user level" 420 (background task) is cycle-time-monitored. The "motion tasks", on the other hand, are not cycle-time-monitored and serve essentially for describing sequential sequences. In other words, the present running level model supports a user both in the programming of sequential sequences and in event programming. Consequently, synchronous events and asynchronous events can be covered by the programming. The user programs (AP1–AP4; FIG. 5) created by the user also can be loaded into the user levels. The user programs AP1 to AP4 are usually created with the aid of a programming environment of the engineering system (ES; FIG. 3).

Referring to FIG. 5, an illustrative diagram presenting the additional loading of user programs into the user levels and distinctive characteristics of user levels of the running level model is shown. There also may be additional user levels and system levels in the model, as indicated by three dots. The relative priority of the levels is indicated as above by an arrow 510 in the direction of the highest priority. The user levels are assigned the user programs AP1 to AP4. The assignment is shown by assignment arrows ZP1 to ZP4. In the user levels there are tasks which receive the user programs AP1 to AP4. These tasks are then performed or processed in accordance with a specific strategy (for example sequentially).

Referring to FIG. 6, an illustrative diagram presenting a hierarchical structure of the integrated running level model with a wait_for_condition command is provided. The wait_for_condition command (represented in FIG. 6 as wait_for_cond( )) is used by way of example in this representation in the "sequential user level" 630. The wait_for_condition command is used in the "motion tasks" MT1 and MT2 created by the user, which are component parts of the "sequential user level" 630. The "motion tasks" MT1 and MT2 are operated in a round-robin cycle, represented by the arrow from MT1 to MT2 and by the return arrow from MT2 to MT1. The three points inside this return arrow indicate that there may be other "motion tasks" in the round-robin cycle. The "motion task" MT1 contains the wait_for_condition command "wait_for_cond(cond_1)" 680, the "motion task" MT2 contains the wait_for_condition command "wait_for_cond(cond_2)" 682. Three points used in each case within MT1 and MT2 indicate that, in addition to the two wait_for_condition commands and the three positioning commands 686 pos1( ) to pos3( ), still further commands may be contained in the "motion tasks".

The running level model of a runtime system for an industrial controller represented in FIG. 6 includes the following levels (enumerated from the lowest to the highest priority): "cyclical user level" 620, "sequential user level" 630 (the tasks of these two levels have the same priority, represented by the dashed line between these levels), "time-controlled user level" 640, "event-controlled user level" 650, "user level for system exceptions" 660, "synchronously clocked user level 2" 472, "synchronously clocked user level 1" 474, "synchronously clocked system level 2" 476 and, as the highest-priority level, a "synchronously clocked system level 1" 478.

An exemplary operating mode of the wait_for_condition command is shown by "wait_for_cond(cond_1)" 680 from the "motion task" MT1. If the "motion task" MT1 is next in turn in the round-robin cycle, the commands of the "motion task" MT1 are serviced until the time slice has elapsed, or an interruption occurs. If this is the case, the "motion task" MT2 is serviced as the next task in the cycle, etc. If the wait_for_cond(cond_1) 680 command is processed in the "motion task" MT1, the condition cond_1 is checked. If cond_1=true, that is to say the condition is satisfied, the next-following command pos2( ) is immediately executed. If appropriate, further commands present in MT1 are successively processed until control is passed to the next task.

If the condition cond_1=false, that is to say is not satisfied, the "motion task" MT1 is immediately interrupted and MT2 is serviced in the round-robin cycle. The condition cond_1 is inserted into the "synchronously clocked system level 2" 476 (indicated by the solid angled-away arrow from the wait_for_cond(cond_1) 680 command to the "synchronously clocked system level 2" 476) and is checked in the clock cycle of this system level to ascertain whether it has been satisfied. If the condition cond_1 is satisfied, the current task is displaced in the round-robin cycle, i.e. it has the time slice withdrawn from it and the motion task MT1 is continued immediately after the wait_for_cond(cond_1) 680 with the positioning command 686 pos2( ). The return from the "synchronously clocked system level 2" 476 to the positioning command 686 pos2( ), i.e. to the "sequential user level" 630, is indicated by the dashed arrow.

The fact that, when the condition of the wait_for_ condition command has not been satisfied, the checking for the condition takes place in a high-priority "synchronously clocked system level" and, when the condition has been satisfied, the interrupted "motion task" is continued immediately makes it possible for a user to specify extremely time-critical applications by simple language means during the programming of sequences of movements. The performance and deterministics are further enhanced by only inserting and considering currently applicable conditions when checking the conditions in the respective high-priority "synchronously clocked system levels".

The mechanism described here does not require an explicit event handler. An advantage from the user viewpoint is consequently that the user can formulate high-priority events in a sequential running program on a relatively low priority level of a "motion task" in the program flow with the aid of program constructs. The user does not have to switch into another program which is then projected by means of other mechanisms (for example manually or under interrupt control) onto a synchronous user task. The user has the possibility to formulate, the "waiting for high-priority event" and "high-priority reaction" cycle in a closed user program for this event.

The conditions which are monitored in a wait_for_ condition command can be formulated by the user. For instance, the user can use program variables from a user program, internal variables of the controller, or can also reference process signals. These variables then may be combined either logically, arithmetically or by any desired functions in terms of their content, to formulate a condition from them. Furthermore, if the condition is satisfied, a program code such as, i.e. an underlying response, which is user-programmable, may also be executed with high priority, so that the return to the low-priority level only takes place after execution of this program code.

Referring to FIG. 7, a block diagram presenting how the basic clock is obtained for the industrial controller is illustrated. FIG. 7 shows an exemplary communication topology into which the controller S is integrated. The controller S is connected by a connection line A2 to the bus B1, to which the external device EG is attached via a connection line A1. The connection to the technical process P2 takes place via the bus B2. The controller S is connected via the connection line A3 to the bus B2, which in turn establishes the connection to the technical process P2 via the connection line A4.

The generation of the basic clock for the controller S can take place from different clock sources. For example, from an internal clock source, represented by the internal timer T2 of the controller S or by an external clock source, such as for example the timer T1, which belongs to the external device EG. The basic clock of a communication medium may also serve as an external clock source. If the bus B2 is realized by an equidistant Profibus, the clock for the controller can be obtained from the basic clock of this bus. This is represented in FIG. 7 by the timer T3 being positioned directly on the connection line A3, which establishes the connection to the bus B2. The controller is consequently attached to the bus as a slave and can use the bus clock directly.

There are several variant ways in which the clock for the controller can be obtained from the basic clock of a communication medium (for example a bus). On the one hand, the controller S may be the slave on the bus; the clock information then comes from outside via the bus. On the other hand, the controller S may be the master on the bus. The clock source in this case lies in the controller S. Two forms with distinctive characteristics exist for this case. The clock source may lie in a master-bus access circuit or the clock source is in the controller S, in which case the clock is fed into the master-bus access circuit. Furthermore, a clock generator TG which is integrated in the technical process P2 may serve as an external clock source. A clock generator TG in a technical process may be, for example, the operating cycle of a production machine or packaging machine.

In the representation according to FIG. 7, bus connections are represented by way of example as communication media. However, ring, star or other types of connection may also be chosen as communication media, as well as wireless connections. The basic clock mentioned above can then be derived from these connection systems.

Figure 8:
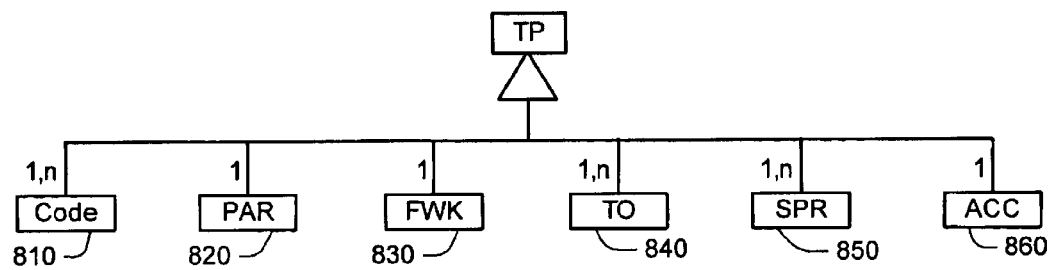
FIG. 8 is a block diagram presenting an object-oriented structure of a technology package.

Referring to FIG. 8, a block diagram presenting an object oriented (OO) structure of a technology package as illustrated. The associated cardinalities are indicated by a customary numerical notation, where a technology package TP has several component parts:

(a) executable code sections (code) 810;

(b) parameters (PAR) 820;

(c) firmware configuration (FWK) 830;

(d) at least one technology object type (TO) 840;

(e) voice mechanisms (SPR) 850; and (f) declaration and description section (ACC) 860.

The 1 to n code sections 810 (for example C functions) are used, for example, for movement guidance, position control or for some other technology. The code sections 810 may comprise, inter alia, commands for temperature control, automatic temperature control or for special technologies, such as compressing or plastics processing. The manner in which these code sections in the running level model of the controller are inserted into the system levels and in which sequence they are processed, may be fixed in the firmware configuration FWK 830. This consequently contains the information relating to which system level a code section is to be integrated in and, if a plurality of code sections are to be integrated in a system level, in which sequence these code sections are to be processed.

The parameter section PAR 820 includes interfaces (masks, combo boxes, rules for the dependence of the parameters on one another, etc.) for the engineering system (ES; FIG. 3) and also the mechanisms for the runtime system (RTS; FIG. 3) which permit parameterization. The user consequently has the possibility of parameterizing instances of technology object types TO 840 of a technology package TP according to various requirements.

With the aid of the 1 to n voice mechanisms SPR 850 of a technology package TP, the voice set of the engineering system (ES; FIG. 3) can be extended by commands and operators which are adequate and meaningful for the underlying technology package TP with its associated 1 to n technology object types TO 840. Voice mechanisms SPR 850 are loaded into the engineering system (ES; FIG. 3) and into the runtime system (RTS; FIG. 3) of the controller. Once such voice mechanisms (for example "increase temperature") have been installed in the engineering system (ES; FIG. 3), they are known in the compiler and in the interface or browser of the engineering system (ES; FIG. 3) and can be used directly by the user in user programs. Plug & play technology ensures that in the engineering system (ES; FIG. 3) known voice mechanisms are also present as an executable piece of code in the runtime system (RTS; FIG. 3). The user consequently uses the specification of the voice mechanisms; he need no longer concern himself with the implementation in the runtime system (RTS; FIG. 3). The ACC component 860 of a technology package TP contains the description of all the voice elements which the technology package TP contains, the description of all the system variables and all the types which are used in the technology package TP. The ACC component 860 consequently corresponds to a declaration and description section for the technology package TP. This ACC component 860 is primarily loaded into the runtime system (RTS; FIG. 3) of the controller. This ensures that all the information with respect to existing technology packages TP and technology object types TO 840 is located in the runtime system of the controller. This enables a connection of operator control and observation devices, such as operator panels.

The foregoing merely illustrates the principles of the invention. It will be appreciated that various modifications and alterations to the described embodiments will be apparent to those skilled in the art in view of the teachings therein.

It will thus be appreciated that those skilled in the art will be able to devise numerous techniques which, although not explicitly shown or described herein, embody the principles of the invention and are thus within the spirit and scope of the invention, which is set forth in the appealed claims.

We claim:

1. An industrial controller for production machines having a runtime system, the runtime system having a running level model with a hierarchical structure, the running level model comprising:
    (a) a group of synchronously clocked levels derived from a basic clock, the group of levels including at least one system level and at least one user level, with each said level having a priority level assigned to it, said at least one user level being operable to run synchronously in relation to at least one of said system levels;
    (b) a user level for system exceptions, having a priority hierarchically located below said group of synchronously clocked levels;
    (c) an event-controlled user level, having a priority hierarchically located below said user level for system exceptions;
    (d) a time-controlled user level, having a priority hierarchically located below said event-controlled user level;
    (e) a sequential user level, having a priority hierarchically located below said time-controlled user level; and
    (f) a cyclical user level, having a priority hierarchically located below said sequential user level.

2. The industrial controller as claimed in claim 1, wherein the basic clock of the running level model is derived from an internal timer.

3. The industrial controller as claimed in claim 1, wherein the basic clock of the running level model is derived from an internal clock of a communication medium.

4. The industrial controller as claimed in claim 1, wherein the basic clock of the running level model is derived from an external device.

5. The industrial controller as claimed in claim 1, wherein the basic clock of the running level model is derived from a variable which belongs to the technological process.

6. The industrial controller as claimed in claim 1, wherein the event-controlled user level, the time-controlled user level, the sequential user level, the cyclical user level and the user level for system exceptions are optional.

7. The industrial controller as claimed in claim 1, wherein the levels of the group of synchronously clocked levels are clocked in relation to the basic clock with a step-up ratio.

8. The industrial controller as claimed in claim 1, wherein the levels of the group of synchronously clocked levels are clocked in relation to the basic clock with a step-down ratio.

9. The industrial controller as claimed in claim 1, wherein the levels of the group of synchronously clocked levels are clocked in relation to the basic clock with a 1:1 ratio.

10. The industrial controller of claim 1, wherein further prioritizing stratifications are provided within the running level model.

11. The industrial controller of claim 1, wherein user tasks are run during either of system start-up and system shutdown.

12. The industrial controller of claim 1, wherein for at least one user level in the running level model a corresponding user program is loaded.

13. The industrial controller of claim 12, wherein said user programs are programmed either in a cycle-oriented manner.

14. The industrial controller of claim 12, wherein said user programs are programmed either in a sequential manner.

15. The industrial controller of claim 1, wherein a technology package is loaded into said at least one system level.

16. The industrial controller of claim 1, further comprising at least one mechanism which enables users to wait in a program flow for a desired condition, the program flow continuing when the condition is satisfied and the program flow being halted until it is established that the condition has been satisfied, the priority of monitoring for the condition being above the priority of the current task priority until for the condition is satisfied.

17. The industrial controller as claimed in claim 16, wherein the conditions being monitored are selected from the group consisting of process signals, internal signals of the controller, and variables from user programs.

18. The industrial controller of claim 1, wherein various running levels which are processed in multiples of a basic clock are available, with technological functions being freely assigned to the running levels.

19. The industrial controller of claim 1, wherein a runtime system of the controller contains a running level model which has a plurality of running levels of different types with different priority, the following running levels being provided:
    running level model which has a plurality of running levels of different types with different priority, the following running levels being provided:

(a) a level which is activated when there are technological faults,
(b) a level which is activated when there is cycle time monitoring of the background tasks,
(c) a level which is activated when there are programming faults,
(d) a level which is activated when there are system faults,
(e) a level which is activated when there are faults or alarms in the peripherals,
(f) a level which is activated when time monitors respond,
(g) at least one level which is activated when user interrupts are detected,
(h) an interpolator level,
(i) at least one level for timer interrupts,
(j) at least one level for the, preferably sequential, processing of motion tasks and
(k) a level for background processing, wherein further user tasks being run through during system start-up and during system shut-down.

20. The industrial controller as claimed in claim 19, wherein the basic clock of the running level model is derived from one of an internal timer, an internal clock of a communication medium, an external device and a variable which belongs to the technological process.

21. A method for the creation of a runtime system of an industrial controller with synchronously clocked system and user levels, comprising the steps of:
(a) generating a clock signal from one of an internal clock, a communication system, an external device or a variable of a technological process,
(b) providing system and user levels for the runtime system which provide running levels synchronized with respect to this basic clock,
(c) providing of at least one user level which is integrated in a synchronous manner with respect to the system level or levels; and
(d) programming said at least one user level.

* * * * *